US 7,069,169 B2

(12) United States Patent
Nakakita et al.

(10) Patent No.: US 7,069,169 B2
(45) Date of Patent: Jun. 27, 2006

(54) METHOD AND APPARATUS FOR MEASURING HEAT FLUX DISTRIBUTION ON OBJECT SURFACE USING TEMPERATURE-SENSITIVE PAINT

(75) Inventors: Kazuyuki Nakakita, Chofu (JP); Keisuke Asai, Chofu (JP)

(73) Assignee: Japan Aerospace Exploration Agency, Chofu (JP)

( * ) Notice: Subject to any disclaimer, the term of this patent is extended or adjusted under 35 U.S.C. 154(b) by 148 days.

(21) Appl. No.: 10/743,786

(22) Filed: Dec. 24, 2003

(65) Prior Publication Data

US 2004/0138850 A1 Jul. 15, 2004

(30) Foreign Application Priority Data

Dec. 27, 2002 (JP) .................................... 2002-381614

(51) Int. Cl.
*G01K 11/12* (2006.01)

(52) U.S. Cl. ...................... 702/130; 702/127; 702/134; 374/159; 374/161; 374/162

(58) Field of Classification Search ................ 702/130, 702/134, 127; 374/159, 161, 162
See application file for complete search history.

(56) References Cited

U.S. PATENT DOCUMENTS 4,885,633 A * 12/1989 Buck .......................... 348/135
6,648,506 B1 * 11/2003 McGrath et al. ............ 374/161
6,804,622 B1 * 10/2004 Bunker et al. ............... 702/134

OTHER PUBLICATIONS

J. P. Hubner et al.; Journal of Thermophysics and Heat Transfer, vol. 16, No. 4, pp. 516–522, Oct.–Dec. 2002.
T. Liu et al.; Journal of Thermophysics and Heat Transfer, vol. 9, No. 4, pp. 605–611, Dec. 1995.
G. M. Buck; 21$^{st}$ AIAA Aerodynamic Measurement Technology and Ground Testing Conference, Jun. 19–22, 2000. Denver, CO.
Tadao Koyama et al.; Measurement of Heat Transfer Distribution by Infrared Thermography Technology, vol. 19, No. 75, Oct. 1999.

* cited by examiner

*Primary Examiner*—John E Barlow, Jr.
(74) *Attorney, Agent, or Firm*—Westerman, Hattori Daniels & Adrian, LLP

(57) ABSTRACT

An object of the present invention is to provide a method that allows the heat flux distribution on an object surface to be measured even when the heat flux is an unsteady or short-duration phenomenon, and that does not depend on the material of the object; and to provide a system for measuring the heat flux distribution on an object surface with the aid of this method. In the method for measuring the heat flux on an object surface in accordance with the present invention, the emission intensity of a temperature-sensitive paint that varies with the temperature of the object surface is chronologically captured and sensed as video information at a high frame rate, an image of the temperature distribution on the object surface is obtained based on characteristics between the emission intensity and temperature calibration, and the heat flux in each domain is calculated by the Cook and Feldermann method.

7 Claims, 4 Drawing Sheets

(2 of 4 Drawing Sheet(s) Filed in Color)

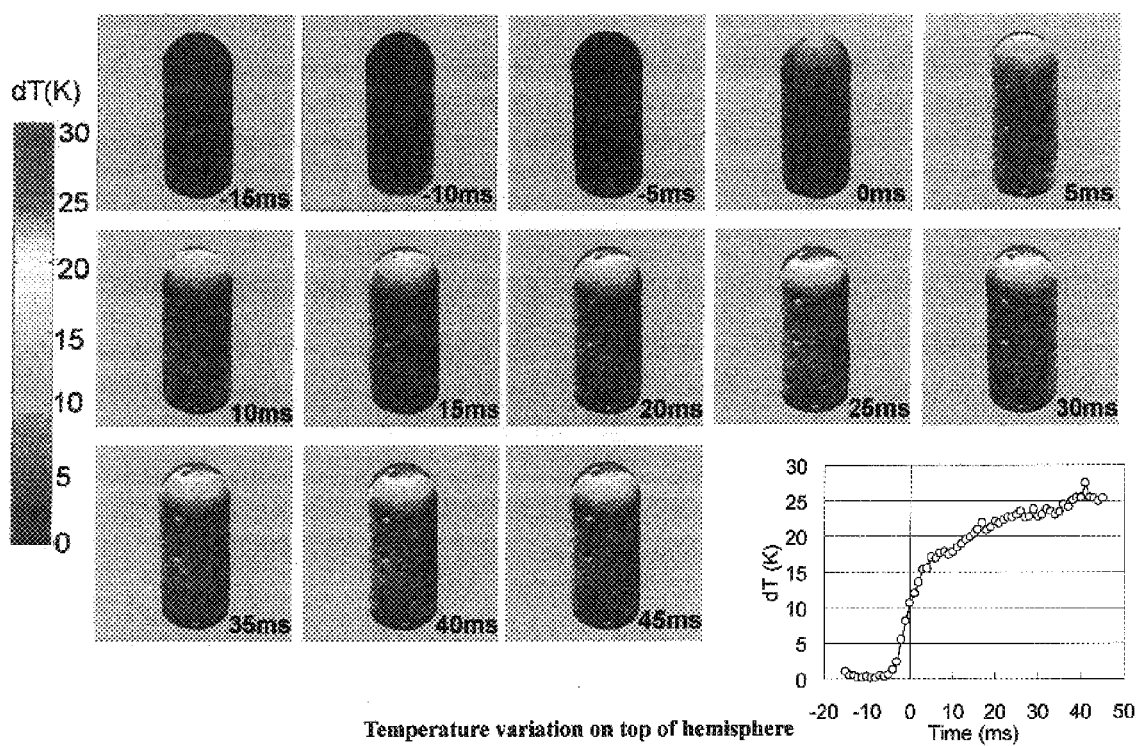

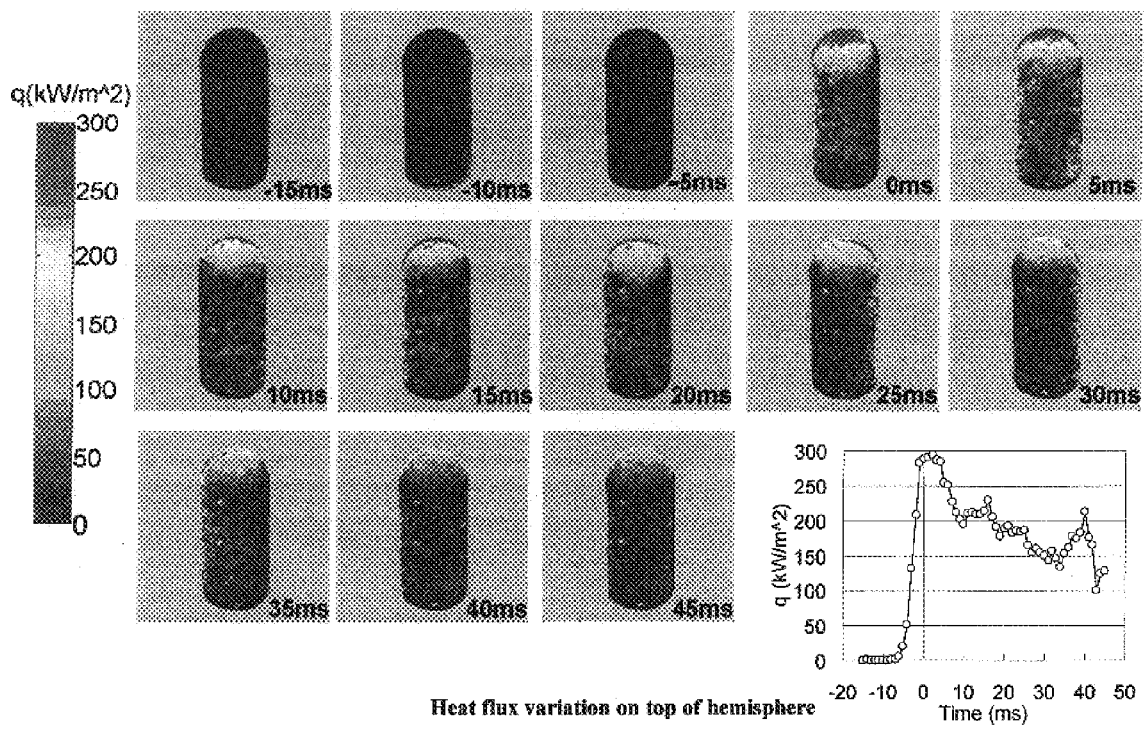

METHOD AND APPARATUS FOR MEASURING HEAT FLUX DISTRIBUTION ON OBJECT SURFACE USING TEMPERATURE-SENSITIVE PAINT

BACKGROUND OF THE INVENTION

1. Field of the Invention

The present invention relates to a method for imaging and measuring the heat flux distribution on an object surface, and to a heat flux distribution imaging and measurement system suitable for measuring the heat flux distribution on the body surface of a thermodynamic apparatus, commonly a rocket or an aircraft, by means of this method.

2. Description of the Related Art

In conventional practice, several measurement methods have been reported as imaging and measurement techniques for calculating heat fluxes using temperature-sensitive paint. For example, the techniques disclosed in nonpatent reference 1 (J. P. Hubner, et al., "Heat-Transfer Measurements in Hypersonic Flow Using Luminescent Coating Techniques," Journal of Thermophysics and Heat Transfer, Vol. 16, No. 4, 2002) and nonpatent reference 2 (T. Liu, et al., "Heat Transfer Measurement on a Waverider at Mach 10 Using Fluorescent Paint," Journal of Thermophysics and Heat Transfer, Vol. 9, No. 4, 1995) entail applying a temperature-sensitive paint to an object surface and detecting its emission thereof to calculate the heat flux, but limitations are imposed by these techniques on the calculation of the heat flux. For example, nonpatent reference 1 offers two types of analysis techniques. At first method, the emission intensity and heat flux in an image are correlated using an in-situ method, and at the second method, a calculation is made the assumption of the steady heat flux. The in-situ method is one in which calibration characteristics are obtained while experiments are performed, and, according to this reference, the calibration characteristics are calculated upon finding a correlation between the intensity of emission from a temperature-sensitive paint and data from a number of heat flux sensors mounted on an object surface, which is the measurement object. A calculation performed on the assumption of the steady a heat flux cannot be applied to randomly varying phenomena because this approach is not valid for phenomena in which the heat flux varies over time. According to nonpatent reference 2, a heat flux is calculated on the assumption of steady heat conduction, but this methods has limitations in terms of its applicability to unsteady phenomena or short-duration phenomena.

Methods in which the measurement object is made of ceramics, and thermographic phosphors are admixed into the ceramics or an infrared camera is used are cited as techniques using materials other than temperature-sensitive paints. These methods are described, for example, in nonpatent reference 3 (G. M. Buck, "Simultaneous Global Pressure and Temperature Measurement Technique for Hypersonic Wind Tunnels," AIAA 2000-2649, 2000) and nonpatent reference 4 (Tadao Koyama, Shoichi Tsuda, "Aerodynamic Heating Measurement by Infrared Thermography," Journal of the Visualization Society of Japan, Vol. 19, No. 75 (October 1999)). According to nonpatent reference 3, the measurement objects are limited to ceramics, making this method inapplicable to objects that comprise arbitrary materials. In addition, the method of nonpatent reference 4 is substantially difficult to apply to metals or other low-emissivity materials. Furthermore, both nonpatent reference 3 and nonpatent reference 4 describe calculations performed on the assumption of the steady the heat flux, and are thus inapplicable to unsteady phenomena.

SUMMARY OF THE INVENTION

An object of the present invention is to provide a method that allows the heat flux distribution on an object surface to be measured even when the heat flux is an unsteady or short-duration phenomenon, and that does not depend on the material of the object; and to provide a system for measuring the heat flux distribution on an object surface with the aid of this method.

In the method for measuring the heat flux on an object surface in accordance with the present invention, the emission intensity of a temperature-sensitive paint that varies with the temperature of the object surface is chronologically captured and sensed as video information at short time intervals, and the heat flux in each domain is calculated based on temperature variations in each of the separate domains on the object surface in a state in which excitation light is incident on the object surface that comprises an arbitrary material and is coated with a heat-sensitive paint.

The heat-sensitive paint used may comprise a rare-earth complex, transition metal complex, polycyclic aromatic compound, porphyrin, or phthalocyanine.

In the method for measuring the heat flux on an object surface in accordance with the present invention, video data captured based on the characteristic information, itself captured by the correlative calibration of temperature and the emission intensity of the heat-sensitive paint, are converted to temperature data as a preprocessing routine of a heat flux calculation in order to obtain accurate temperature information.

The apparatus for measuring the heat flux on an object surface in accordance with the present invention comprises an excitation light source for irradiating the surface of a measurement object coated with a temperature-sensitive paint; a high-speed imaging apparatus for imaging the measurement object; means for determining the temperature of each separate domain on the object surface on the basis of characteristic data related to the emission intensity and temperature of the temperature-sensitive paint; and means for calculating the heat flux in each domain from the temporal variations of temperature in each separate domain. Also provided are means whereby heat flux data calculated for each separate domain are converted to video information in accordance with the position on the surface of the measurement object, and a function is provided for displaying this image on a display. Further provided is a feature whereby the data for each of the separate domains on the object surface employ the information of a single pixel in the CCD camera of the imaging apparatus.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a chronological representation of temperature distribution images obtained by processing images captured in accordance with an embodiment of the present invention; and FIG. 4 is a chronological representation of heat flux distribution images obtained by processing images captured in accordance with an embodiment of the present invention.

DESCRIPTION OF THE PREFERRED EMBODIMENTS

Figure 1:
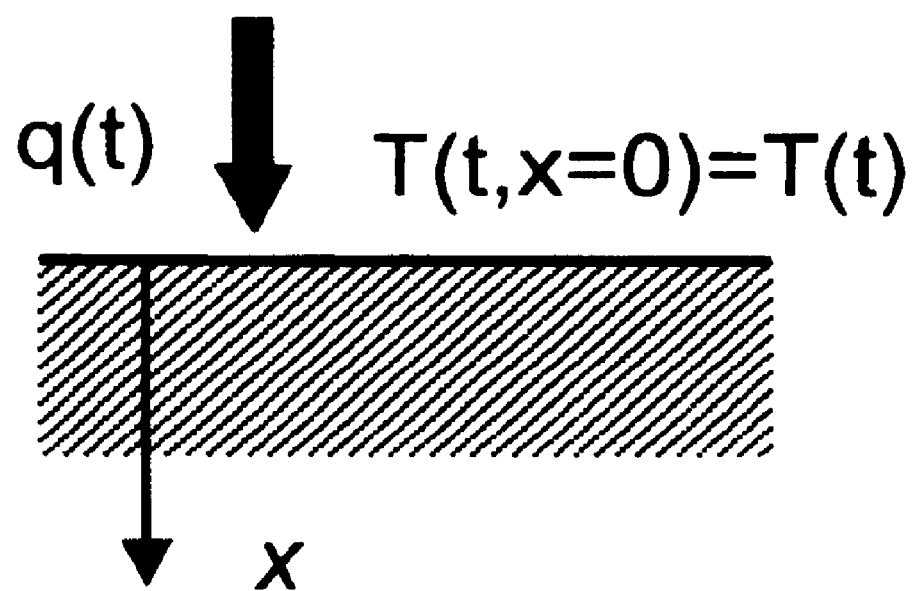
FIG. 1 is a coordinate system the phenomenon of a heat flux based on the heating of an object surface.

The present invention is intended to overcome the limitations based on calculation methods such as the conventional techniques in which an image is taken of a measurement object coated with a temperature-sensitive paint whose emission intensity varies in accordance with the temperature, data related to the distribution of temperature on the object surface are obtained based on the video information, and the heat flux is calculated based on these temperature data; and to provide a method in which the heat flux can be calculated for an unsteady or short-lived phenomenon, irrespective of the material of the measurement object. Emission of light by a heat-sensitive paint is a principle that is made inherently possible by the fact that some of the chemical substances that emit fluorescence are substances whose emission intensity varies greatly with temperature. Such substances exhibit a phenomenon called temperature quenching, whereby excited molecules are caused by vibrations to fall to the ground state without any radiation, and light emission decreases when the temperature is raised. As long as the temperature remains within certain limits, a function is satisfied whereby the logarithm of the ratio of emission intensity is proportional to reciprocal temperature. A theoretical formula has been derived, but few phenomena commonly follow this theoretical formula, and empirical formulas obtained by the calibration testing of paint samples are currently in use.

According to the present invention, the surface of a measurement object is coated with a heat-sensitive paint whose emission intensity varies in response to the temperature. To obtain light emission from this heat-sensitive paint, it is necessary to use a xenon light source, LED, laser, or other light source for excitation light, and to supply light whose wavelength is suited to the excitation of the heat-sensitive paint used. The emission intensity of each portion on the surface of the measurement object is measured as a digital image using a visible-light CCD camera in order to sense the emission intensity from the heat-sensitive paint and to convert the sensed value to temperature. When the goal is to capture the heat flux information of an unsteady transient or a rapid variations phenomena instead of temperature information at a certain point in time, this goal is achieved in the present invention by a high-speed CCD digital video camera because of the need for temperature information that is continuous in time. The digital image of emission intensity as an indicator of the surface temperature distribution thus sensed is converted to a temperature image by using a characteristic value obtained by a calibration test in which the temperature and emission intensity are correlated in advance. The calibration characteristics obtained in advance by such a calibration test must be prepared in the form of accumulated information because temperature-emission intensity characteristics vary with the temperature-sensitive paint used as described above. The temporally continuous temperature images are converted to a heat flux using known formulas for computing heat fluxes.

A heat flux calculation method using temperature history (Cook and Feldermann method) for the surface temperature is adopted in the present invention as a method for determining the heat flux directed from gas toward a measurement object (model). The heat flux measurement method itself is known, and the heat flux at a point on a model is commonly measured using a resistance thermometer or thermocouple as the temperature sensor. In the present invention, this method entails obtaining temperature distribution video data related to the surface of a temperature object on which a temperature-sensitive paint is used, and calculating a heat flux from the temperature data that had assumed the form of such video data.

The temperature history measurement technique for the surface temperature will be described herein. First, a heating rate q(t) is designated for a surface temperature measurement when the object is heated by outside gas and the surface temperature is equal to T at time t, as schematically shown in FIG. 1.

The increase in surface temperature that occurs in a hypothetical case of heat conduction from a primary source with semi-infinite depth can be expressed by the following linear heat equation.

$$\frac{\partial T}{\partial t} = \frac{k}{\rho c} \frac{\partial^2 T}{\partial x^2} \quad (1)$$

$$\dot{q} = -k \frac{\partial T}{\partial x} \quad \text{at } x = 0$$

$$T = 0 \quad \text{at } x = \infty$$

In the above equation, T is the increased temperature in relation to the initial temperature, x is the depth from the surface, q is the heat flux, $\rho$ is the density of the measurement object, c is the specific heat of the measurement object, and k is the heat conductivity of the measurement object.

Based on Eq. (1), the surface temperature increase can be expressed as $$T_{surface} = \frac{1}{\sqrt{\pi} \sqrt{\rho c k}} \int_0^t \frac{\dot{q}_s(\tau)}{(t-\tau)^{1/2}} d\tau \quad (2)$$

This can be rewritten to give the heating rate $$\dot{q}(t) = \sqrt{\frac{\rho c k}{\pi}} \left[ \frac{T(t)}{\sqrt{t}} + \frac{1}{2} \int_0^t \frac{(T(t) - T(\tau))}{(t-\tau)^{3/2}} d\tau \right] \quad (3)$$

Since the second term in the square brackets in this equation contains a 0/0 form, the following equation, obtained by the linear interpolation and adjustment of the spaces between temperature measurement points, can be used for the numerical solution.

$$\dot{q}(t) = 2\sqrt{\frac{\rho c k}{\pi}} \sum_{i=1}^{m} \frac{T(i) - T(i-1)}{(t_m - t_i)^{1/2} + (t_m - t_{i-1})^{1/2}} \quad (4)$$

In the present invention, the heat flux information for each separate domain is obtained by applying the above method to video information that indicates the temperature distribution in each separate domain on the surface of a measurement object, but a significant feature of the present invention is that the heat flux distribution is imaged and displayed in a state in which the shape of the measurement object is reproduced in the same manner as an image that represents the heat flux information of each separate domain as a temperature distribution. The heat flux on the surface of the measurement object can thereby be displayed in a clear manner in accordance with the position on the surface of the object. In addition, the sensing rate can be increased using a high-speed imaging apparatus, making it possible to capture chronological information in smaller increments and to obtain temporally continuous heat flux images, and hence to accommodate and measure unsteady transient phenomena and specific changes of short duration, which have so far been difficult to handle.

Embodiment

Figure 2:
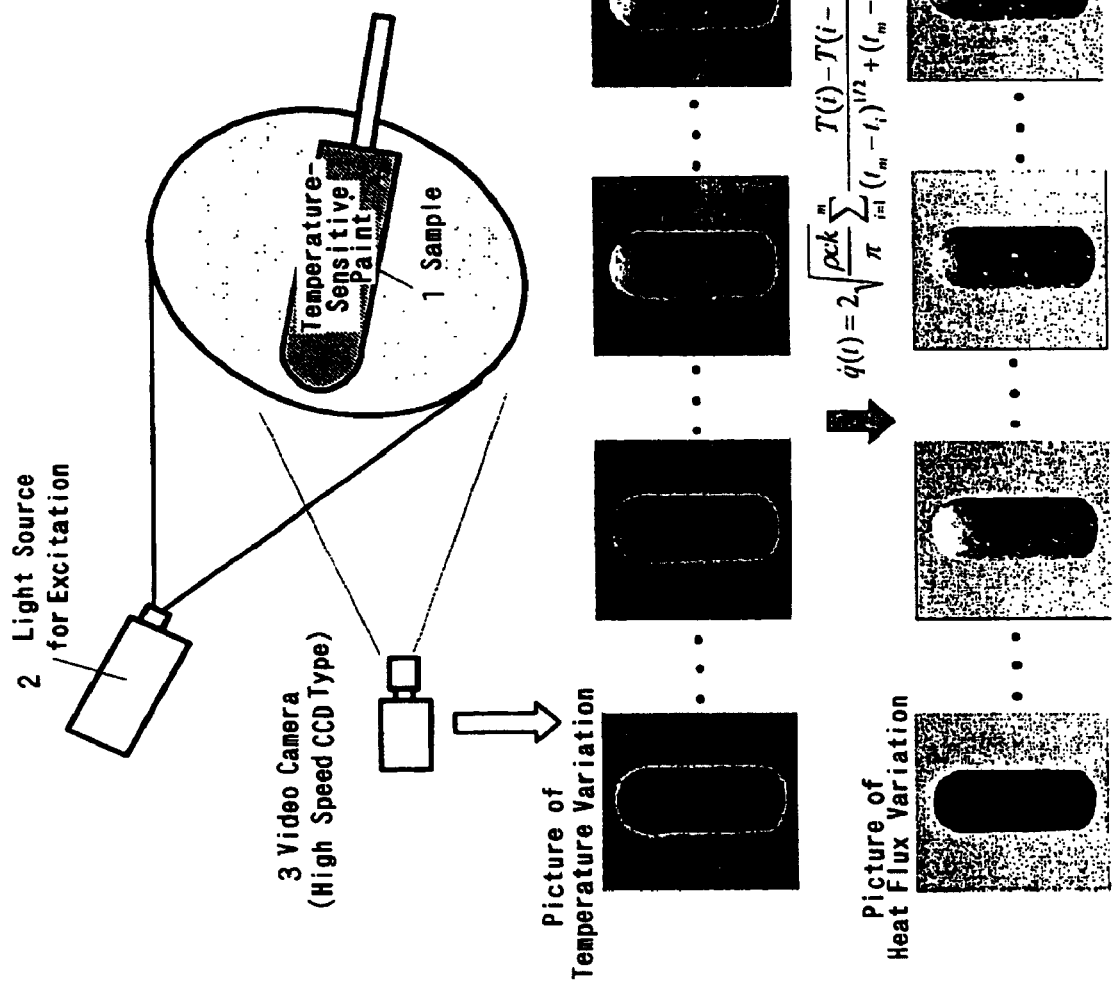
FIG. 2 is a diagram depicting the measurement system and the processing of captured images in the apparatus for measuring the heat flux on an object surface in accordance with the present invention.

An embodiment of the present invention will now be described. FIG. 2 depicts the basic structure of the measurement apparatus. 1 is a body model as a measurement object, shaped as a cylinder with a hemispherical top portion. The dimensions are a diameter of 20 mm and a length of 50 mm. The temperature-sensitive paint applied to the surface may, for example, be a paint obtained by adding a temperature-sensitive pigment (for example, a laser pigment or a ruthenium complex) to methyl polymethacrylate, polyacrylic acid, or another polymer as a binder. In the present embodiment, dichlorotris(1,10-phenanthroline)-ruthenium (II) hydrate), which is a ruthenium complex, was used as the temperature-sensitive dye, and polyacrylic acid as the binder. The thickness of the film formed by the applied temperature-sensitive paint was about 1 μm. Excitation light consistent with the absorption line of the temperature-sensitive paint is needed in order to obtain emission from the temperature-sensitive paint. A YAG laser or Ar laser may be used as the excitation light source 2, and an Ar laser was used in the present embodiment. A high-speed CCD video camera for visible light with an A/D resolution of 10 bit or greater and a measurement capacity of 1 kHz or greater was used as the imaging apparatus 3 for measuring the emission intensity from the temperature-sensitive paint, and images were taken every 1 ms. Characteristic data that correlate the emission intensity and temperature of a previously used temperature-sensitive paint was captured by calibration testing and stored in a data-processing computer (not shown).

The test model 1 was mounted in a wind tunnel and measured. In the experiment of the present embodiment, the model was mounted in a 0.44-m hypersonic shock tunnel of the Japan Aerospace Exploration Agency and subjected to a Mach 10 air flow. The corresponding airflow temperature was about 1200K. The test model 1 in the wind tunnel was irradiated with laser light from the excitation light source 2, and the excited emission from the surface thereof was imaged by the high-speed CCD video camera 3, which is a imaging apparatus, and captured and sensed as original video data for indicating temperature distribution information about the test model 1. An image of the test model 1 in a state of uniform temperature distribution at a known temperature was first taken and stored as a reference image prior to the experiment. The test image data obtained after the start of the experiment were divided by these reference image data and normalized as a fractional emission energy image. This was used to compensate for the nonuniformities of the temperature-sensitive paint on the surface of the test model 1 and for the nonuniformities of light from the excitation light source. In the present embodiment, in which a CCD camera was used, the information for each domain that indicated the temperature distribution could be handled in agreement with the single-pixel information of the CCDS. It was also possible to handle the information about separate domains as groups of several averaged or appropriately weighted pixels. The video data obtained by normalizing the imaged initial video data by means of the reference image were calibrated based on the aforementioned stored characteristic data of the relation between the emission intensity and temperature, yielding a temperature distribution image. FIG. 3 depicts a hard copy of the temperature distribution image. In this figure, the images are displayed every 5 ms, but the actual images were imaged every 1 ms. The graph in the figure was obtained by plotting the data for the temperature of the top portion at prescribed time intervals (1 ms). There is no blow of hot air in the beginning, and the time when a hot air flow starts blowing is minus 4 ms from the moment a temperature increase is registered, as can be seen from the graph. It can also be seen that the temperature is stable in the beginning and that the temperature of the top portion starts increasing sharply the moment a Mach 10 hot air flow starts blowing. The calibrated images are grayscale images that correspond to the temperature distribution, but the figures attached to the specification are limited in that they are binarized electronic images incapable of clearly expressing such grayscale information. For this reason, it was decided to process the grayscale images in FIG. 3 and to represent them as contour lines, and also to submit the original images, which are expressed as color gradations, as separately attached documents.

The heat flux calculation formula shown previously as Eq. (4) was subsequently applied to the temperature distribution information about the test model 1 captured and sensed as video data, and heat flux data for each of the separate domains were calculated and captured. These heat flux data were obtained for each of the separate domains of the test model 1, and these were converted as video information in correspondence with each of the separate domains of the test model 1 in the same manner as the temperature distribution images above, and were displayed on a display or were output as a hard copy on a printer. These heat flux distribution images are also grayscale images, but the figures attached to the specification are limited in that they are binarized electronic images incapable of clearly expressing such grayscale information. For this reason, it was decided to process the grayscale images in FIG. 4 and to represent them as contour lines, and also to submit the original images, which are expressed as color gradations, as separately attached documents. In FIG. 4, the video information is displayed every 5 ms in the same manner as in FIG. 3, but the actual images were taken every 1 ms. The graph in the figure was obtained by plotting the heat flux data for the top portion at prescribed time intervals (1 ms). A particularly remarkable feature of the graph in FIG. 4 is that the heat flux was found to increase sharply the moment the blow of a Mach 10 hot air flow started in the top portion, and to gradually decrease thereafter. Because the present embodiment employs a high-speed CCD video camera with a high frame rate, or video capture rate, the original video data that indicates the temperature distribution information about the test model 1 is variable chronological video information that can be sensed at closely spaced time intervals, making it possible to obtain and accumulate temporally continuous temperature distribution images and heat flux distribution images, and to present these images as a chronological series. The aforementioned experimental results allow instantaneously occurring transient phenomena to be sensed as unsteady variations. In addition, the heat flux data can be displayed in a clear manner in accordance with the separate domains of the test model 1 by means of graphic representation.

In the method for measuring the heat flux on an object surface in accordance with the present invention, the emission intensity of an object surface that comprises an arbitrary material and is coated with a temperature-sensitive paint is irradiated with excitation light; the emission intensity of the temperature-sensitive paint, which varies in accordance with the temperature of the object surface, is captured and sensed in this state as video information in a chronological sequence at a high frame rate such as 100 Hz or greater; and the heat flux in each of the separate domains on the object surface is calculated based on the temperature variations in this domain by the Cook and Feldermann method, making it possible to rapidly measure the heat flux as an image over time not only in phenomena in which the heat flux varies in a steady manner, but also in phenomena in which the heat flux varies in an unsteady manner. The present invention can be used by applying a temperature-sensitive paint to a measurement object, and hence makes it possible to image and measure the heat flux without selecting the material.

The present invention, in which a material comprising a rare-earth complex, transition metal complex, polycyclic aromatic compound, porphyrin, or phthalocyanine is used as the temperature-sensitive paint, allows a heat flux to be imaged and measured with high accuracy because the emission intensity can respond with high sensitivity to the temperature variations on the object surface.

The method for measuring the heat flux on an object surface in accordance with the present invention, in which captured image data are converted to temperature data on the basis of characteristic information captured by the correlative calibration of temperature and the emission intensity of the temperature-sensitive paint, allows surface temperature to be accurately sensed based on the emission intensity of the temperature-sensitive paint applied to the surface of the object.

The apparatus for measuring the heat flux on the object surface in accordance with the present invention comprises an excitation light source for irradiating the surface of a measurement object coated with a temperature-sensitive paint; a high-speed imaging apparatus for imaging the measurement object; means for determining the temperature of each separate domain on the object surface on the basis of characteristic data related to the emission intensity and temperature of the temperature-sensitive paint; and means for calculating the heat flux in each domain from the temporal variations in the temperature of each separate domain, making it possible to devise an apparatus that has a simple system and allows the heat flux to be rapidly measured as an image over time not only in phenomena in which the heat flux varies in a steady manner, but also in phenomena in which the heat flux varies in an unsteady manner. In addition, data can be rapidly processed by storing a formula for calculating heat fluxes, and also storing characteristic data related to the emission intensity and temperature of a temperature-sensitive paint.

The apparatus for measuring the heat flux on an object surface in accordance with the present invention comprises means whereby heat flux data calculated for each separate domain are converted to video information in accordance with the position on the surface of the measurement object, and also comprises a function whereby this image is displayed on a display, wherein positional information and information about the temperature or heat flux are accumulated in sets, making it possible to perform conversion to CAD information or to carry out other types of processing, to allow the results to be displayed on a display as video information correlated with the position of the measurement object, and to output the result as a hard copy to a printer, and hence to make it possible to display the distribution in a clear manner.

In the apparatus for measuring the heat flux on an object surface in accordance with the present invention, in which a CCD video camera is used as the imaging apparatus, the information of a single pixel can be directly used as data related to each separate domain on the object surface, and the sensed data can be processed with extreme ease.

What is claimed is:

1. A method for measuring the heat flux on an object surface, wherein the emission intensity of a temperature-sensitive paint that varies with the temperature of the object surface is chronologically captured and sensed as video information at a high frame rate, and the heat flux in each domain is calculated using the following formula on the basis of temperature history in each of the separate domains on the object surface in a state in which excitation light is incident on the object surface that comprises an arbitrary material and is coated with a temperature-sensitive paint:

$$\dot{q}(t) = 2\sqrt{\frac{\rho c k}{\pi}} \sum_{i=1}^{m} \frac{T(i) - T(i-1)}{(t_m - t_i)^{1/2} + (t_m - t_{i-1})^{1/2}}.$$

2. The method for measuring the heat flux on an object surface according to claim 1, wherein the temperature-sensitive paint comprises any of a rare-earth complex, transition metal complex, polycyclic aromatic compound, porphyrin, and phthalocyanine.

3. The method for measuring the heat flux on an object surface according to claim 2, wherein the captured video data are converted to temperature data on the basis of characteristic information, which is captured by the correlative calibration of temperature and the emission intensity of the temperature-sensitive paint, as a preprocessing routine of a heat flux calculation.

4. The method for measuring the heat flux on an object surface according to claim 1, wherein the captured video data are converted to temperature data on the basis of characteristic information, which is captured by the correlative calibration of temperature and the emission intensity of the temperature-sensitive paint, as a preprocessing routine of a heat flux calculation.

5. An apparatus for measuring the heat flux on an object surface, comprising:

an excitation light source for irradiating the surface of a measurement object coated with a temperature-sensitive paint;

a high-speed imaging apparatus for imaging the measurement object;

means for determining the temperature of each separate domain on the object surface on the basis of characteristic data related to the emission intensity and temperature of the temperature-sensitive paint; and means for calculating the heat flux in each domain from the temporal variations of temperature in each separate domain using the following formula:

$$\dot{q}(t) = 2\sqrt{\frac{\rho c k}{\pi}} \sum_{i=1}^{m} \frac{T(i) - T(i-1)}{(t_m - t_i)^{1/2} + (t_m - t_{i-1})^{1/2}}.$$

6. The apparatus for measuring the heat flux on an object surface according to claim 5, comprising means for converting heat flux data calculated for each separate domain to video information in accordance with the position on the surface of the measurement object; and a function for displaying this image on a display.

7. The apparatus for measuring the heat flux on an object surface according to claim 5, wherein the data for each of the separate domains on the object surface are the information of a single pixel in the CCDs of the imaging apparatus.

* * * * *